Mar. 13, 1923.
J. F. O'CONNOR.
FRICTION SHOCK ABSORBING MECHANISM.
FILED APR. 6, 1921.
1,448,493.
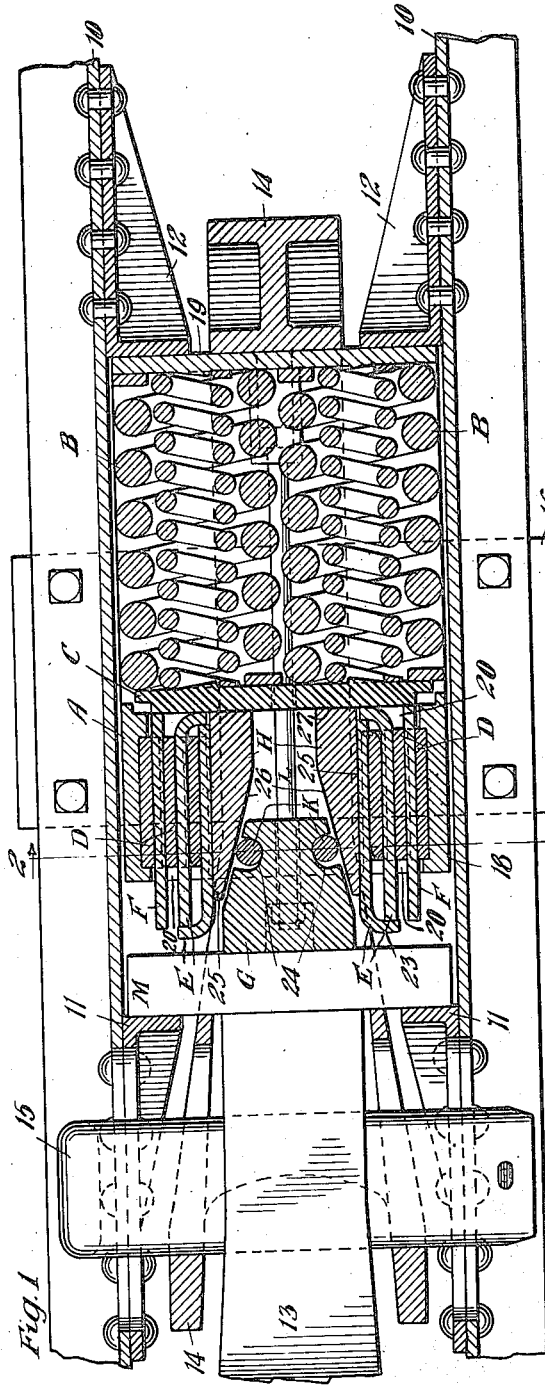
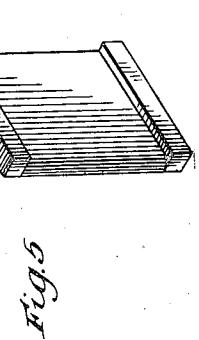
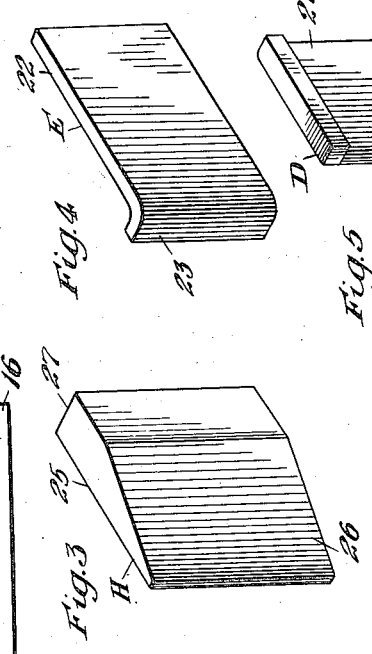
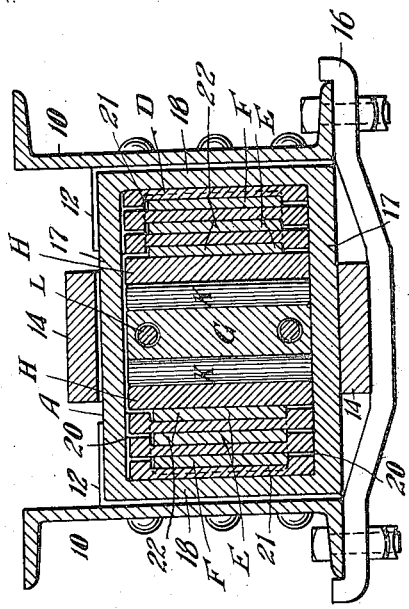
Inventor
John F. O'Connor Patented Mar. 13, 1923.

1,448,493

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed April 6, 1921. Serial No. 459,067.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein are obtained high capacity, a graduated smooth action, and certain release.

Another object of the invention is to provide a mechanism of the character above indicated wherein is employed a large amount of frictional wearing areas to the end that the pressure per unit of friction area may be retained at a relatively low point and excessive wear thereby avoided.

A special feature of the invention is to provide a mechanism of the character indicated so arranged that the spreading or wedging action exerted laterally or transversely of the friction elements is limited to a predetermined amount during the initial part of the compression stroke of the mechanism and increase of such wedging pressure thereafter avoided independently of the actuating force so that danger of excessive pressure on any of the parts is avoided.

Other objects of the invention will more clearly appear from the description and claims hereinafter following.

In the drawing forming a part of this specification, Figure 1 is a horizontal, longitudinal, sectional view of a portion of a railway draft rigging showing my improvements in connection therewith. Figure 2 is a vertical, transverse, sectional view corresponding substantially to the line 2—2 of Figure 1. And Figures 3, 4 and 5 are perspective views of one of the wedge elements, one of the movable friction plates and one of the stationary friction plates, respectively.

In said drawing, 10—10 denote channel center or draft sills of a railway car to the inner faces of which are secured front stop lugs 11—11 and rear stop lugs 12—12. A portion of a drawbar is indicated at 13, the same being operatively associated with the shock absorbing mechanism proper by means of a hooded cast yoke 14 and coupler key 15. The yoke and parts contained therein are adapted to be supported in operative position by a detachable saddle plate 16.

The improved shock absorbing mechanism, proper, as shown, comprises, broadly, a casing or column-load-sustaining member A; twin arranged springs B—B; a spring follower C; a plurality of relatively stationary friction plates D—D; a plurality of relatively movable friction plates E and F; an outer central wedge element G; two inner wedge elements H—H; anti-friction rollers K; and retainer bolts L. A front follower M of well known form is also shown interposed between the drawbar and the outer wedge G.

The member A is preferably in the form of a malleable casting and, as shown, is formed at the forward end thereof with a hollow box-like casing having upper and lower walls 17—17 and side walls 18—18. The upper and lower walls 17—17 are extended to the rear end of the casting and there united by a vertical rear wall 19 which cooperates with the lugs 12 and acts as a follower. With this construction the sides of the members A are left open rearwardly of the box-like formation to thereby permit insertion and removal of the springs and spring follower.

On the interior of the box-like portion of the member A, transversely extending upper and lower sets or ribs 20 are provided on each side of the center which form guides or channels within which are received the top and bottom edges of the stationary plates D. The latter, as will be understood by those skilled in the art, are first inserted within the member A centrally thereof and then shifted laterally in the guideways provided by said ribs 20. With this construction, it is evident that the plates D are prevented from movement longitudinally relatively of the member A but are responsive to laterally exerted pressure thereagainst.

Each of the members D is preferably provided on its face nearest the center of the mechanism with a wide channel or groove as indicated at 21, said channels or grooves forming longitudinal guiding seats for the movable plates E and F which are alternated with the relatively stationary plates D.

The movable plates E and F are alternated with the plates D as hereinbefore described and it will be noted that the alternated series of plates are divided into two groups, one on each side of the center line and that the innermost plate of each group is a so-called movable friction plate. I have shown three movable plates in each group, the outermost ones being indicated at F and each of the latter consisting of a substantially rectangular plate without any peculiar or special formation. The innermost pair of movable plates E of each group are of special form and preferably of like construction, one of the same being indicated best in Figure 4. Each of said plates E has a longitudinally extending main section 22 and a turned or bent flanged end as indicated at 23, the ends 23 being sufficiently extended so that, when the two plates E of each pair are oppositely arranged as shown in Figure 1, one will overlap the plain end of the other. The arrangement is such that the innermost plate E has its flanged end disposed nearest the follower M and overlapping the next outer plate E, for the purpose hereinafter described. The inner ends of the plates F and the flanged ends 23 of the intermediate plates E normally bear against the spring follower C, the springs B bearing against the follower C on the rear side thereof.

The wedge element G is inwardly tapered with a pair of oppositely inclined sides, each of the latter being recessed as indicated at 24 to accommodate one of the anti-friction rollers K, the latter having a true free rolling movement within the recesses 24 as clearly indicated in Figure 1.

The two wedge elements H are of like construction and each is formed on its outer side with a plane flat face 25 engaging with the corresponding adjacent face of a plate E. Each member H is further formed with an inclined or wedge face proper 26 on which rides the corresponding roller 24. The inner end of each member H is left flat as indicted at 27 and normally bears against the front face of the follower C. In normal or full release position of the parts, there is a small space left between the front follower M and the bent over ends 23 of the innermost plates E, this space preferably approximating a half inch in actual service. A slightly greater space is left between the follower M and the outermost ends of the plates F so that the latter will be engaged or picked up by the follower M during the compression stroke subsequent to the actuation of the plates E.

The retainer bolts L have their heads and nuts seated in suitable sockets formed in the wedge element G and rear portion of the casting A, said bolts extending through suitable alined openings in the element G and follower C as will be understood. The function of said bolts is to maintain the parts in assembled relation and the springs under an initial compression, if this is desired.

The operation of the mechanism is as follows, assuming an inward or buffing movement of the drawbar. As the drawbar is moved inwardly, thus forcing the front follower M in the same direction, the wedge G is forced to travel simultaneously and uniformly with the drawbar. Due to the friction which exists between the wedge members H and the innermost plates E, said wedge members H for an instant remain stationary while the wedge G advances longitudinally relatively thereto. Immediately after the advance of the wedge G relative to the wedge members H, just indicated, all three wedge members G and H advance longitudinally relatively to the friction plates E. Due to the fact that the innermost two plates E cannot advance without carrying with them the next outer plates E, because of the overlapping flanged ends thereof, the friction on the two plates E of each set on each side of the mechanism is sufficient to overcome any possible dragging of the innermost plates E with the wedge members H. After the follower M and wedge G have advanced approximately a half inch with the shifting position of the parts hereinbefore described, the follower M engages the bent over flanges of the plates E and thereafter the plates E are advanced simultaneously and uniformly with the elements of the wedging system. A little later in the compression movement, the follower M will obviously pick up and thereafter actuate the outer plates F. Prior to the follower M engaging the plates E, it will be noted that the spring follower C has been moved away from the inner ends of the plates E and hence the spring pressure is exerted solely against the wedge members H. The wedging or spreading pressure, having been set up as above described during the approach of the follower M to the plates E, no further change in the wedging or spreading action obtains as the wedging system and plates E are forced inwardly by direct contact with the follower M for the reason that the wedge member G and plates E are obviously compelled to travel in unison at the same rate and the spring pressure or reaction against the wedge members H on the other end of the wedging system is not sufficient to overcome the friction then existing between the wedge members H and the innermost plates E. Consequently, the maximum of wedging or spreading pressure is set up in the mechanism prior to movement of any of the movable friction plates and thereafter the wedging pressure remains uniform so that the resistance of the mechanism as an entirety is rendered strictly proportional to the load applied. By this arrangement of parts, all danger of excessive pressure on any part is avoided and long life thereby insured. As will be obvious to those skilled in the art, the maximum of the wedging or spreading pressure can be varied to accord with the desires of the manufacturer or user by changing the wedging angles, the normal space between the follower M and plates E and spring characteristics. Notwithstanding the limit of wedging or spreading pressure imposed by the arrangement described, the total capacity is unusually high and sufficient for the heavy duty required in present railroad service.

During release, upon discontinuance of the actuating force, the wedge G is initially squeezed outwardly from between the other wedge members H which action is readily permitted because of the anti-friction rollers K. In this way, the wedging or spreading force is immediately reduced to a minimum, thereby permitting the spring to expand sufficiently to shift the wedge members H outwardly relatively to the innermost friction plates E and until the spring follower C engages the inner ends of all of the movable plates, the latter being thereafter pushed outwardly simultaneously with the wedging system. As will be understood by those skilled in the art, the action of the mechanism under draft is the same as above described, except in an opposite direction.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a casing; of a series of longitudinally extending friction elements held by said casing against movement longitudinally relatively thereto but adapted for lateral shifting; a second series of longitudinally extending friction elements alternated with those of the first series and adapted for movement longitudinally relatively thereto; a spring resistance; a follower outside said casing adapted to move said friction elements of the second series longitudinally relatively to those of the first series; and wedge-pressure-transmitting means interposed between said follower and said spring resistance including, an outer member actuated by said follower and having a wedge face, a second inner member having its inner end resisted by said spring resistance and provided with a cooperating wedge face, and anti-friction means interposed between said wedge faces, said second inner member having frictional engagement with one of said friction elements and temporarily immovable with respect thereto during the initial portion of a compression stroke and while the first named outer wedge member is advanced longitudinally relatively thereto, both said wedge members being thereafter advanced a short distance relatively to said friction element, the follower, said wedge-pressure-transmitting means and friction elements of said second named series thereafter moving simultaneously and uniformly.

2. In a friction shock absorbing mechanism, the combination with a casing; of a series of longitudinally extending friction elements held by said casing against movement longitudinally relatively thereto but adapted for lateral shifting; a second series of longitudinally extending friction elements alternated with those of the first series and adapted for movement longitudinally relatively thereto; a spring resistance; a follower outside said casing adapted to move said friction elements of the second series longitudinally relatively to those of the first series; and wedge-pressure-transmitting means interposed between said follower and said spring resistance including, an outer member actuated by said follower and having a wedge face, a second inner member having its inner end resisted by said spring resistance and provided with a cooperating wedge face, and anti-friction means interposed between said wedge faces, said second inner member having frictional engagement with one of said friction elements and temporarily immovable with respect thereto during the initial portion of a compression stroke and while the first named outer wedge member is advanced longitudinally relatively thereto, both said wedge members being thereafter advanced a short distance relatively to said friction elements, the follower, said wedge-pressure-transmitting means and friction element of said second named series thereafter moving simultaneously and uniformly, the friction element frictionally engaged by said inner wedge member being one of those of the second named series.

3. In a friction shock absorbing mechanism, the combination with a casing; of a series of longitudinally extending friction plates mounted in and held by said casing against movement longitudinally relatively thereto, but responsive to lateral pressure; a second series of longitudinally arranged friction plates alternated with those of the first series and adapted for movement longitudinally relatively thereto, said alternated friction plates being divided into two groups, one on each side of the center line of the mechanism; a spring resistance; a follower outside said casing adapted to move the plates of said second series longitudinally relatively to the first named friction plates; and wedge-pressure-transmitting means interposed between said follower and spring resistance and between the two groups of alternated plates, said means including, an outer double-faced wedge member, a pair of inner oppositely disposed cooperating wedge members having their inner ends resisted by said spring resistance, and anti-friction means interposed between the sets of cooperating wedge faces, each of said inner wedge members having frictional engagement with the innermost friction plate of each group and temporarily immovable with respect thereto during the initial portion of a compression stroke and while said outer wedge member is advanced longitudinally relatively thereto, all said wedge members being thereafter advanced a short distance relatively to said friction elements, said follower, wedge-pressure-transmitting means and movable friction plates being thereafter actuated simultaneously and uniformly.

4. In a friction shock absorbing mechanism, the combination with a casing; of a series of longitudinally extending friction plates mounted in and held by said casing against movement longitudinally relatively thereto, but responsive to lateral pressure; a second series of longitudinally arranged friction plates alternated with those of the first series and adapted for movement longitudinally relatively thereto, said alternated friction plates being divided into two groups, one on each side of the center line of the mechanism; a spring resistance; a follower outside said casing adapted to move the plates of said second series longitudinally relatively to the first named friction plates; and wedge-pressure-transmitting means interposed between said follower and spring resistance and between the two groups of alternated plates, said means including, an outer double-faced wedge member, a pair of inner oppositely disposed cooperating wedge members having their inner ends resisted by said spring resistance, and anti-friction means interposed between the sets of cooperating wedge faces, each of said inner wedge members having frictional engagement with the innermost friction plate of each group and diametrically immovable with respect thereto during the initial portion of a compression stroke and while said outer wedge member is advanced longitudinally relatively thereto, all said wedge members being thereafter advanced a short distance relatively to said friction elements, said follower, wedge-pressure-transmitting means and movable friction plates being thereafter actuated simultaneously and uniformly, the innermost friction plate of each group cooperable with the inner wedge members being a movable friction plate.

5. In a friction shock absorbing mechanism, the combination with a column-load-sustaining member; of a plurality of friction elements mounted on said member and held against movement longitudinally relatively thereto but responsive to lateral pressure; of a plurality of relatively movable friction elements alternated with the first named friction elements, said relatively movable friction elements having each one end thereof extended laterally from the main plane of the element over the end of the nearest element of the same series; a spring resistance; and wedging means cooperable with said friction elements for exerting laterally applied pressure therebetween.

6. In a friction shock absorbing mechanism, the combination with a column-load-sustaining member; of a plurality of relatively stationary friction plates mounted on said member and held against movement longitudinally relatively thereto; a plurality of relatively movable friction plates alternated with the first named friction plates, certain of said movable friction plates having each one end thereof extended transverse to the main plane of the plate over the end of the nearest movable friction plate; a spring resistance; and wedging means arranged to impose lateral pressure upon said alternated friction plates.

7. In a friction shock absorbing mechanism, the combination with a column-load-sustaining member having an open-ended casing at one end thereof; a plurality of relatively stationary friction plates disposed within said casing and held against movement longitudinally relatively thereto; a plurality of relatively movable friction plates alternated with the stationary friction plates, said alternated plates being divided into two groups, one on each side of the center line of the mechanism, the innermost plate of each group being a movable friction plate; means for positively insuring simultaneous longitudinal movement of the inner pair of movable friction plates of each group during a compression stroke prior to the movement of the entire group of movable friction plates; a spring resistance; a spring follower interposed between said resistance and the inner ends of the movable friction plates; an outer follower normally separated a limited distance from the outer ends of said movable plates; and wedge-pressure-transmitting means interposed between said two followers and between the two groups of plates, said means including, wedge elements in frictional engagement with the innermost plate of each group, a wedge member actuated by said outer follower, and anti-friction means between said last named member and the other wedge members.

In witness that I claim the foregoing I have hereunto subscribed my name this 16th day of Mch., 1921.

JOHN F. O'CONNOR.

Witnesses:
CARRIE GAILING,
UNA C. PERIN.